(12) United States Patent
Schellenberg

(10) Patent No.: US 7,836,876 B2
(45) Date of Patent: Nov. 23, 2010

(54) DEVICE FOR TRANSPORTING AND STORING COOKED FOOD AND ONE-COURSE MEALS

(75) Inventor: Walter Schellenberg, Glattbrugg (CH)

(73) Assignee: Technikus AG, Vaduz (LI)

( * ) Notice: Subject to any disclaimer, the term of this patent is extended or adjusted under 35 U.S.C. 154(b) by 1096 days.

(21) Appl. No.: 10/496,774

(22) PCT Filed: Nov. 22, 2002

(86) PCT No.: PCT/CH02/00635

§ 371 (c)(1),
(2), (4) Date: May 24, 2004

(87) PCT Pub. No.: WO03/043476

PCT Pub. Date: May 30, 2003

(65) Prior Publication Data

US 2005/0077806 A1 Apr. 14, 2005

(30) Foreign Application Priority Data

Nov. 23, 2001 (CH) .................................. 2164/01

(51) Int. Cl.
A47G 23/04 (2006.01)
(52) U.S. Cl. .................. 126/268; 99/483; 312/404; 312/249.8
(58) Field of Classification Search .................. 126/268, 126/24; 99/483; 312/400, 200, 249.8; 219/386
See application file for complete search history.

(56) References Cited

U.S. PATENT DOCUMENTS 3,291,546 A * 12/1966 Traycoff ............... 312/236
4,030,476 A * 6/1977 Hock ............... 126/268
4,722,268 A * 2/1988 Rightley ............... 99/468
4,730,100 A * 3/1988 Pingelton ............... 219/400
4,921,719 A * 5/1990 Kohlbach ............... 426/521
5,132,520 A * 7/1992 Blanton et al. ............... 219/400
5,209,941 A * 5/1993 Wuest ............... 219/401
5,318,792 A * 6/1994 Tippmann ............... 426/510
5,515,267 A * 5/1996 Alsenz ............... 700/83
5,765,379 A * 6/1998 Jensen ............... 62/45.1
5,797,445 A 8/1998 Westbrooks, Jr. et al.
5,992,411 A 11/1999 Ayot et al.
6,148,875 A * 11/2000 Breen ............... 141/65
6,344,630 B1 * 2/2002 Jarvis et al. ............... 219/386

FOREIGN PATENT DOCUMENTS

| EP | 0 591 760 A1 * | 4/1994 |
| WO | WO 98/07331 A1 | 2/1998 |
| WO | WO 99/04676 A1 | 2/1999 |

* cited by examiner

Primary Examiner—Steven B McAllister
Assistant Examiner—Sarah Suereth
(74) Attorney, Agent, or Firm—Edwin D. Schindler

(57) ABSTRACT

An apparatus for transporting and storing cooked food and one-course meals includes a box-shaped, upright container with wheels and at least one pivoting front door. The container can be closed by the front door in an air-tight manner. The container has at least one air valve toward the outside that can be closed and opened, in addition to a device for measuring and storing and displaying the temperature and pressure inside the closed container, so that temperature and pressure can be read from outside of the container. Data can be read by a personal computer and presented in the form of diagrams, as a function of time, over a period of at least 14 days. The cooked food is, initially, cooled at a temperature of between 2° C. and 4° C., and is then exposed to a vacuum for enabling the cooked food to be kept fresh for up to 14 days.

Figure 1:
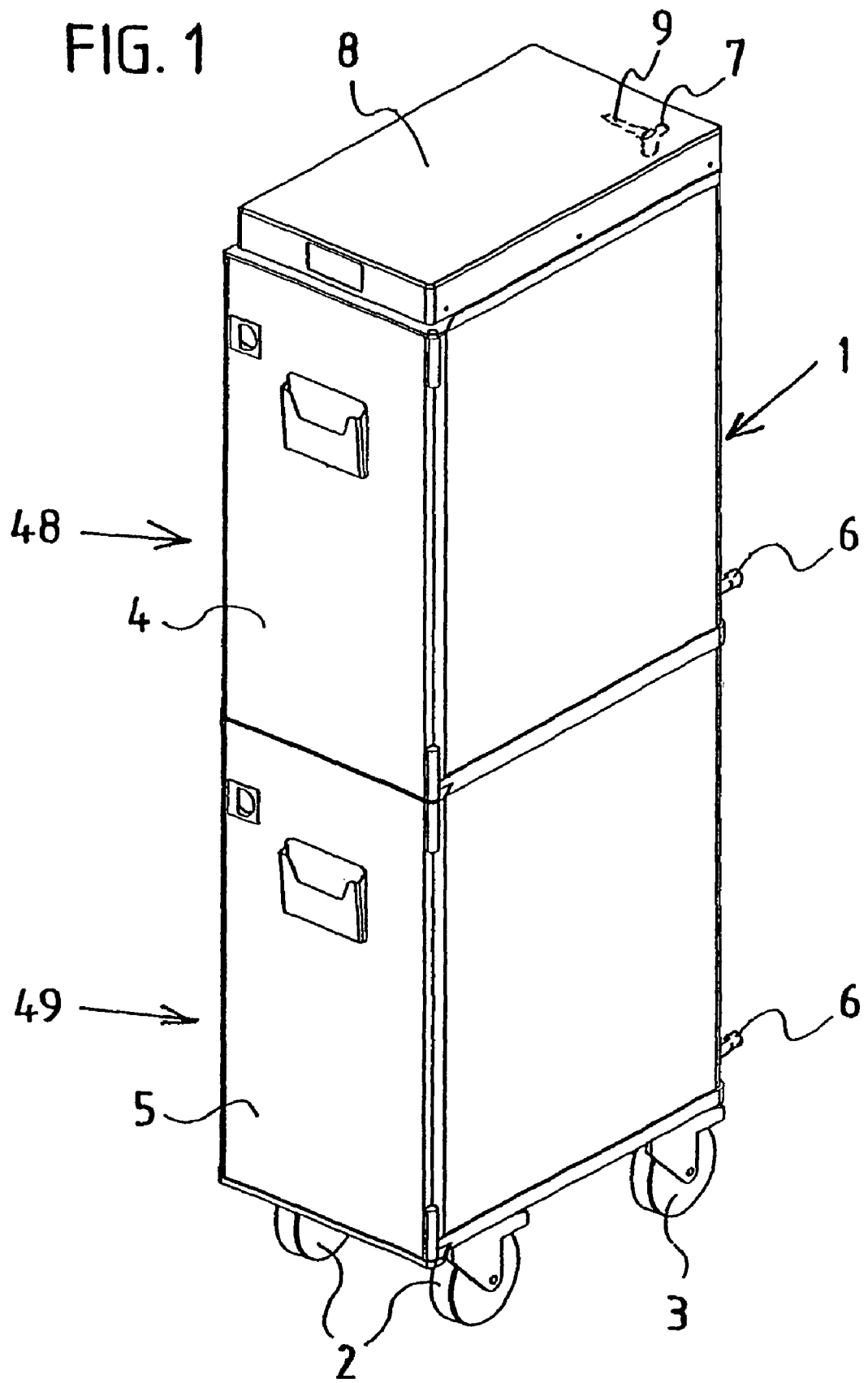

14 Claims, 8 Drawing Sheets

DEVICE FOR TRANSPORTING AND STORING COOKED FOOD AND ONE-COURSE MEALS

BACKGROUND OF THE INVENTION

1. Field of the Invention

This invention relates to a device for the transport and the intermediate storage of already, almost or completely cooked food or ready set-dish meals. The catering for a large number of persons, be it in hotel and restaurant businesses, in homes of all types, but also in military and company canteens, in railway carriages and also ships is becoming more and more demanding. The consumers specifically desire more and more natural, gently cooked and low-fat meals which furthermore are to be as fresh as possible, and are to be served best of all only on porcelain plates and with high quality cutlery. Unit meals served of cheap, disposable plastic plates with disposable plastic cutlery do not satisfy these demands. Kitchen businesses which constantly prepare a large number of high quality set-dish plates or à la carte meals may now indeed fulfil these requirements, but the task is very demanding with regard to logistics and it is quite difficult for everything to be ready at the correct time, and finally to be able to serve the meals to the guest as fresh and as hot as possible. The more food portions need to be rapidly distributed, the more difficult is becomes to complete the preparation of the food at the right moment in time and to serve it to all those being served who wish to eat hot and freshly cooked meals. It is indeed the case that if large banquets are to be held, or are large number of people in a restricted space are to be catered for, one reaches limits with conventional cooking and heat retaining methods. Either the freshness of the food portions suffers, or the naturalness of the meals, or their packaging does not conform to the desired quality requirements. Thus for example the food portions for catering in aircraft are prepared and (deep) frozen in the form of set-dish meals on plastic containers with a see-through lid or removable aluminium foils. Due to the large energy requirement, the food portions are heated even before the start of the aircraft to 150° C. and then shortly before being served the meals are heated for a short time in the on-board hot-air oven to 250° C. for a short time during the flight. The steam is produced in the aircraft with the help of water contained in the meals, which has the effect that these meals are often excessively dried out. This technology and its technical limits also limit the selection of meals. On long haul flights the food portions are not only brought along for the departure flight but also for the return flight, wherein a safety reserve of various set-dish meals is always brought along since the number and composition of the passengers on the return flight is not known before the departure flight. All meals however which are not consumed on the return flight end up as pigs swill. As a rule is not possible to use them again for human consumption due to their lack of freshness.

According to the so-called cook-and-chill method, firstly large quantities of the same meals are cooked in a production kitchen for large quantities of food portions. The food is subsequently portioned in catering standardised dishes and is cooled down from 170° C. to +3° C. within 90 minutes in a shock refrigerator. This is to reduce the formation of bacteria. The meals prepared in this manner, cooled to 1° C. to 4° C., may be kept for five days. Prepared in the correct manner they may be compared to freshly prepared food.

2. Description of the Prior Art

According to the so-called cuission-sous-vide method, the prepared raw products are evacuated in special cooking bags and are cooked in these. All aroma substances are retained by way of this method. No foreign matter may penetrate these. Here too the meals are cooled in a shock-like manner. They may be used without concern for up to 21 days without preservatives.

The above mentioned methods however are not completely convincing with regard to many aspects. With the cook-and-chill method one operates only with the shock cooling which only permits a limited, safe storage capability of approx. 3 days. In practise however a significantly longer storage capability is very desirable. With the cuission-sous-vide method on the other hand although a longer storage capability is ensured, the expense of packaging the individual meals in each case in airtight bags and of evacuating them individually however is very great. The removal from the packaging and preparation required for use on the other hand is very large and a lot of waste material occurs.

A device is known from WO99/04676 which consists of a plate of porcelain as well as a cover which lies on the edge of the plate in a sealing manner, for example in the form of a bell of deep-drawn, transparent plastic. The bell comprises a one-way valve through which the air content of the joined-together parts may be evacuated. The associated serving tray comprises preformed recesses for accommodating at least one plate in a manner secure from slippage. The plates further comprise loose insert containers which are likewise manufactured of porcelain and may be applied into the plate in an exactly fitting complementary manner in various ways so that the surface of the plate is divided into several container regions which are subdivided from one another and the individual insert containers are held on the plate in a manner such that the are secure from slipping. With such a device, a ready prepared set-dish meal cooled to approx 2° C. to 4° C. may be stored up to 14 days, and when required may be heated and served within a few minutes. Since however a cover having a large stability is required for each individual plate, one requires a corresponding amount of space. With the transparent plastic suggested in WO 99/04676, the transparency to light also has an unfavourable effect of the durability of the set-dish meals. Finally the covers may not withstand an unlimited amount of evacuation and in time suffer from breakage so that they lose their sealedness.

It would generally be desirable to be able to freshly serve set-dish meals, for example in hospitals, homes or large hotels so that the consumer also feels that he is being served as if he were to take his meal in a small gourmet restaurant. A system is demanded in order to be able to render the meals as durable as possible with an as large as possible quality with little effort. The meals should be able to be transported and stored without much additional hand manipulation and finally should be able to be prepared and served for direct consumption as rapidly and as simply as possible.

SUMMARY OF THE INVENTION

It is therefore the object of the present invention to create a device for the intermediate storage and transport of cooked food and set-dish meals by way of which the food ready for preparation or in the already prepared condition keeps considerably longer than in conventional containers for such food or set-dish meals, and which furthermore permits a simple transport and intermediate storage of the food and set-dish meals. The above mentioned problems of conventional transport and intermediate storage systems are to be solved with these devices. The device should be able to be used constantly and permit the transport and intermediate storage of food and set-dish meals with a great reliability with regard to maintaining freshness.

This object is achieved by a device for the transport and intermediate storage of cooked food and set-dish meals, comprising a box-like, uprightly arranged container with wheels and with a front door capable of being pivoted open, which is characterized in that the container may be closed in an airtight manner by the front door and comprises at least one air valve to the out-side which may be closed and opened, as well as means for measuring and storing as well as for displaying the tempera-ture and pressure in the inside of the closed container such that they may be read from the outside, over a time period of at least 14 days.

BRIEF DESCRIPTION OF THE DRAWING FIGURES

The device is described in detail and its function and handling is explained by way of the subsequent drawings.

There are shown in

Figure 2:
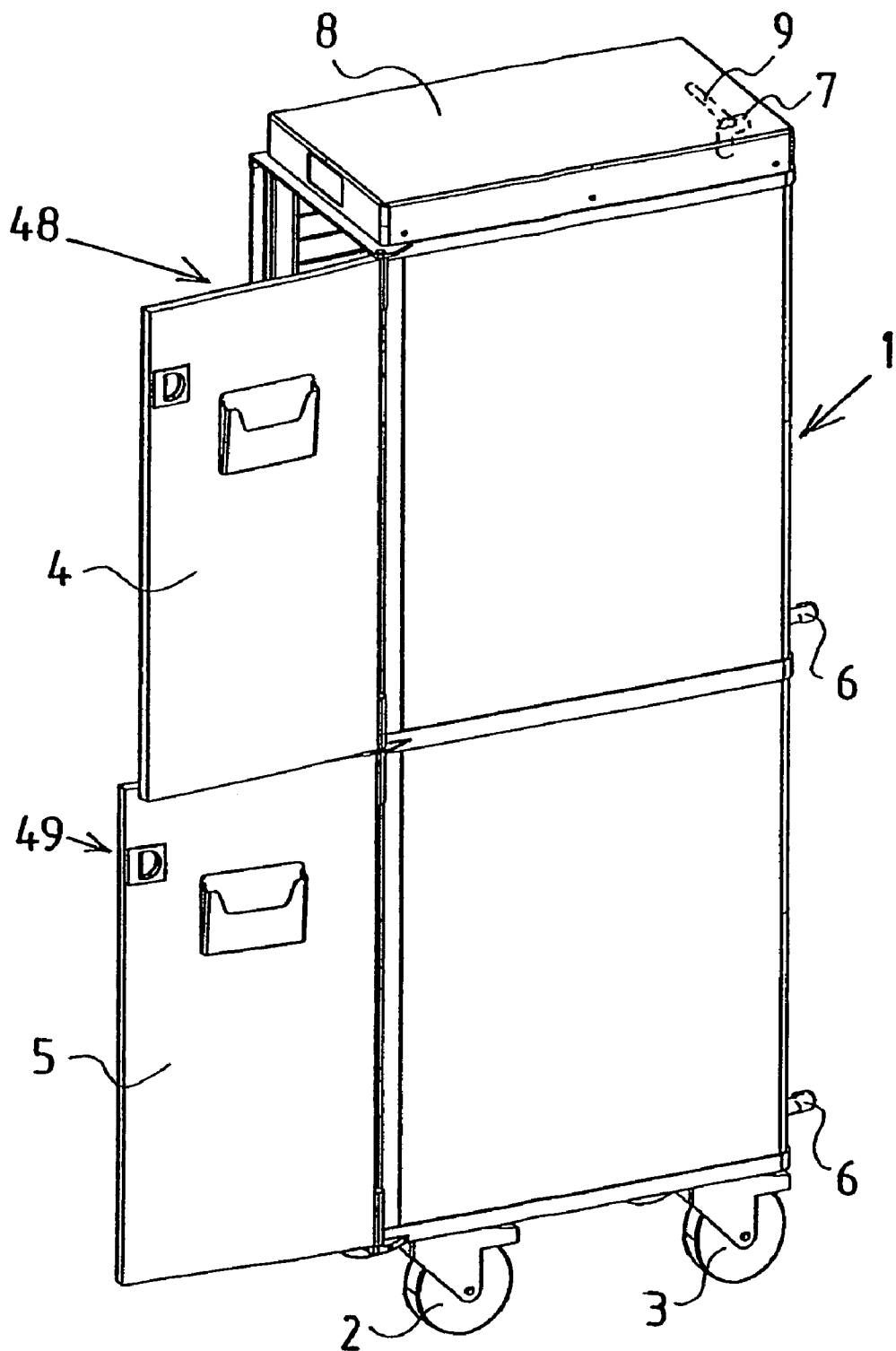
Figure 3:
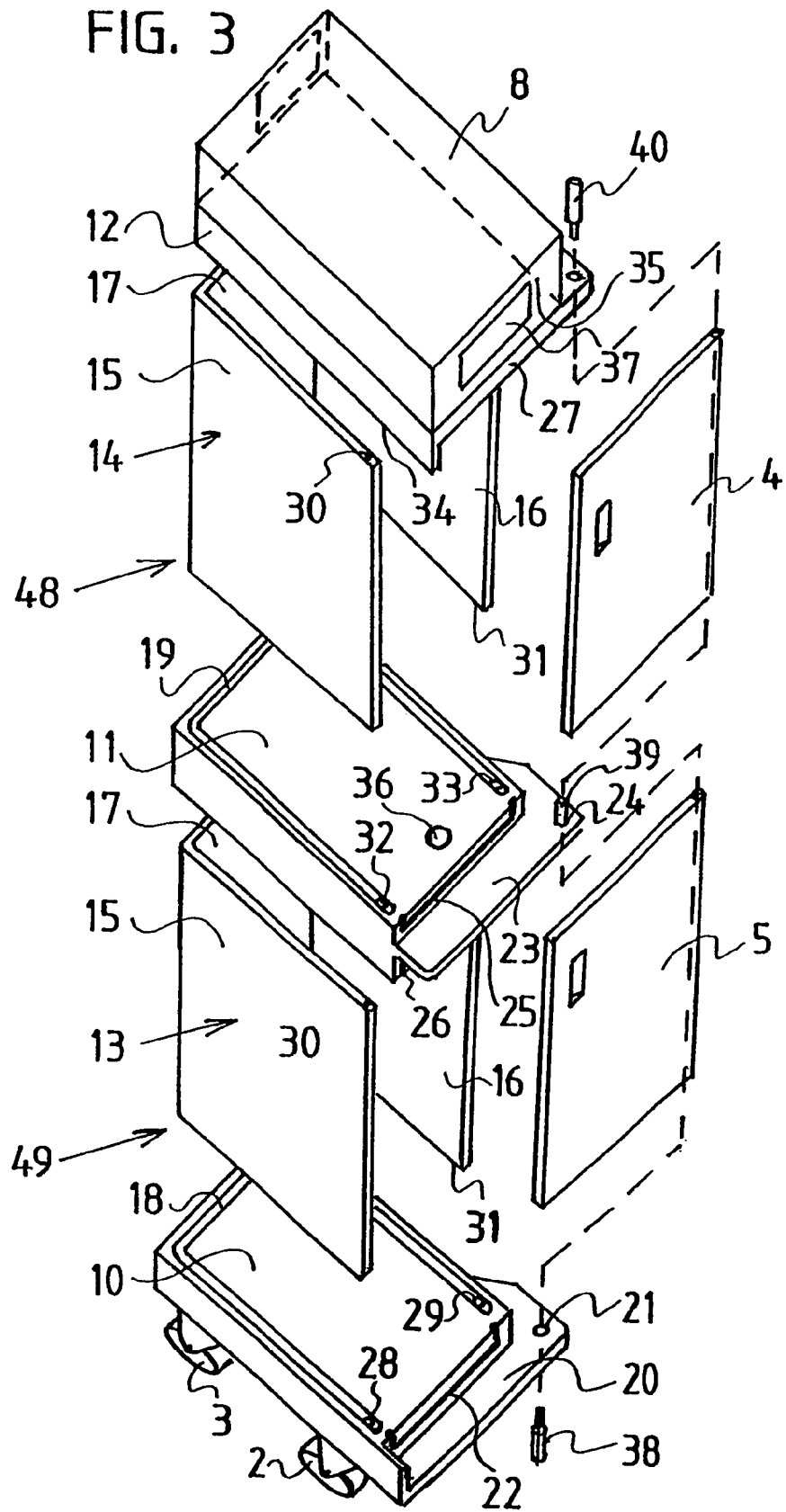
Figure 4:
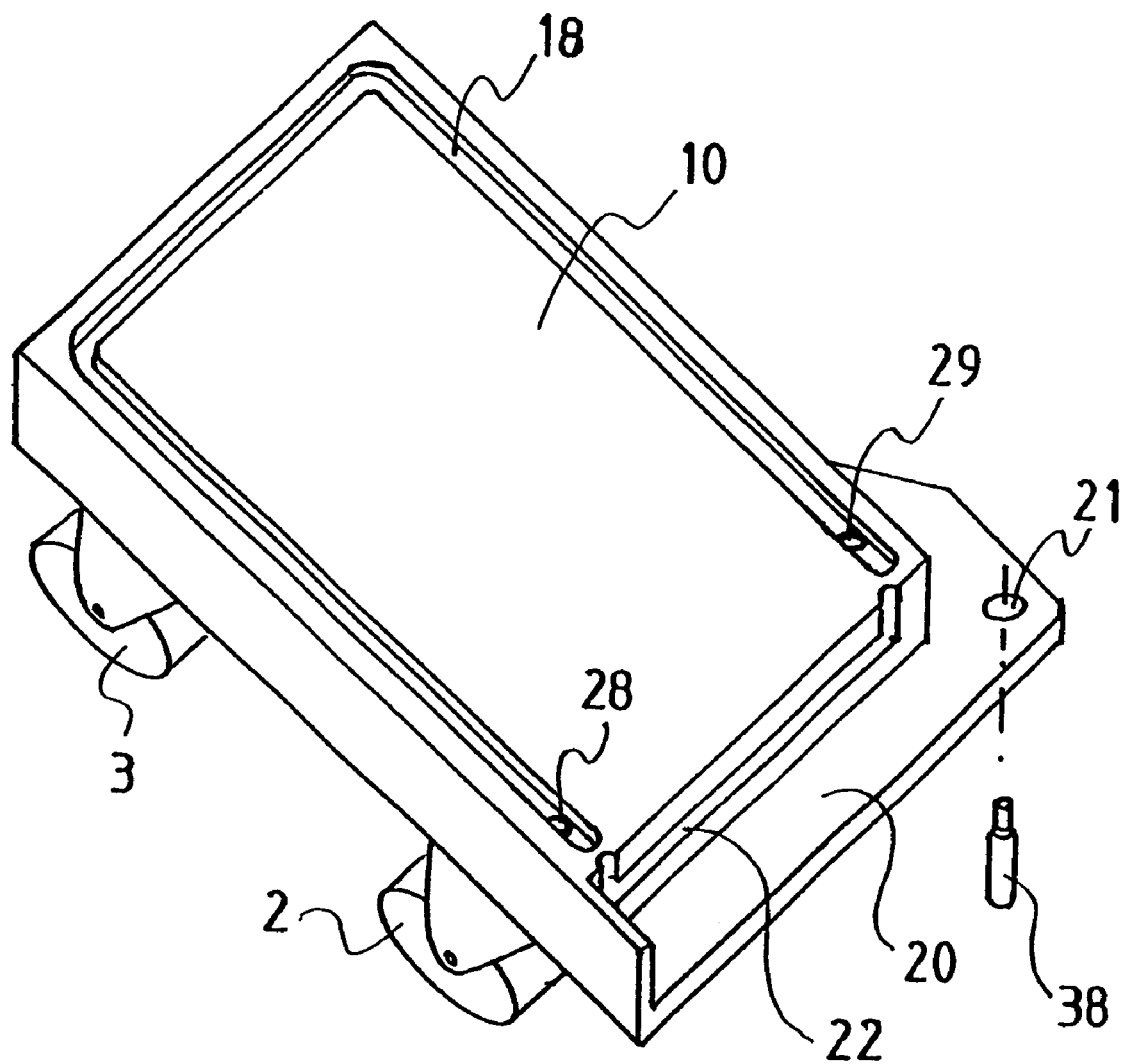
Figures 5, 6:
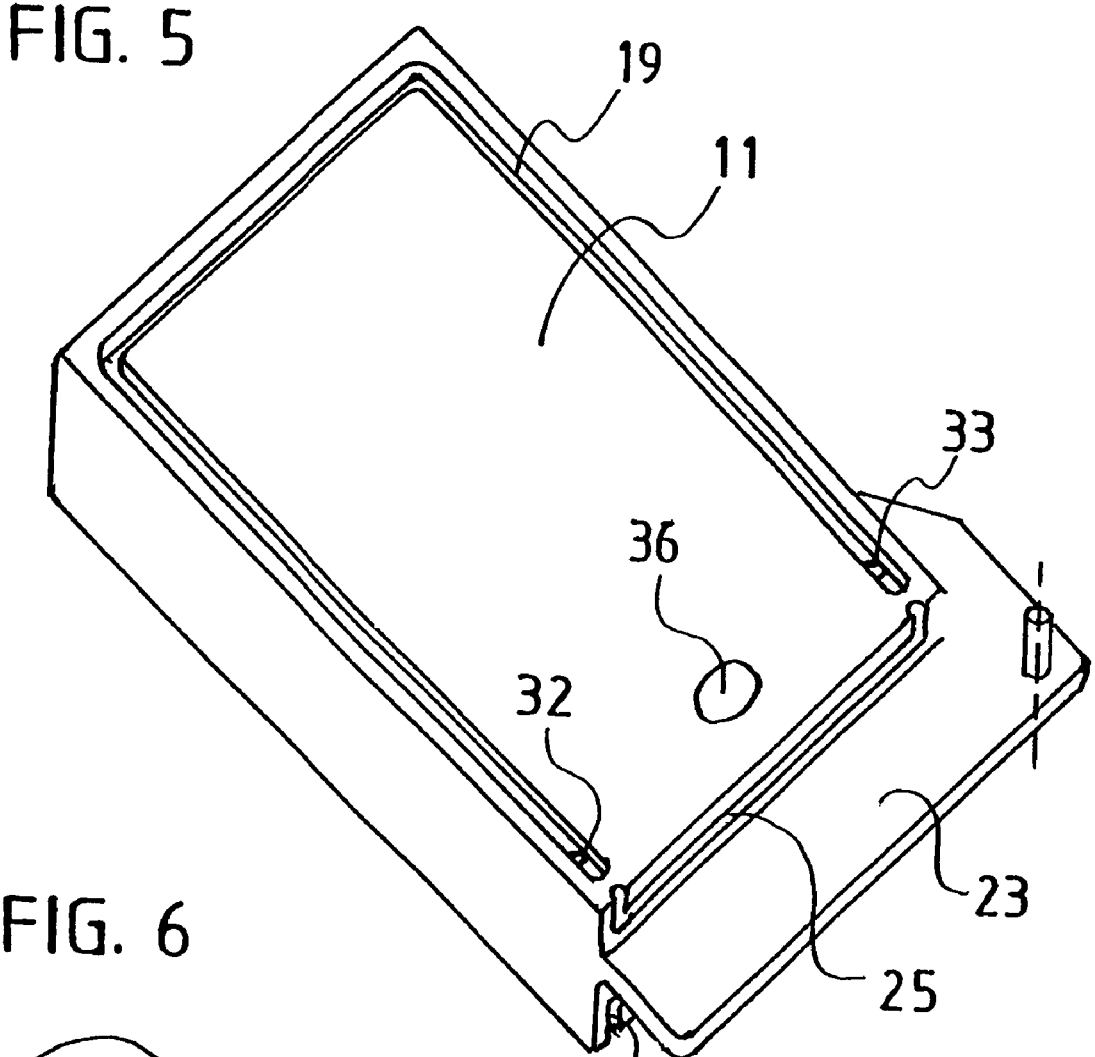
Figure 7:
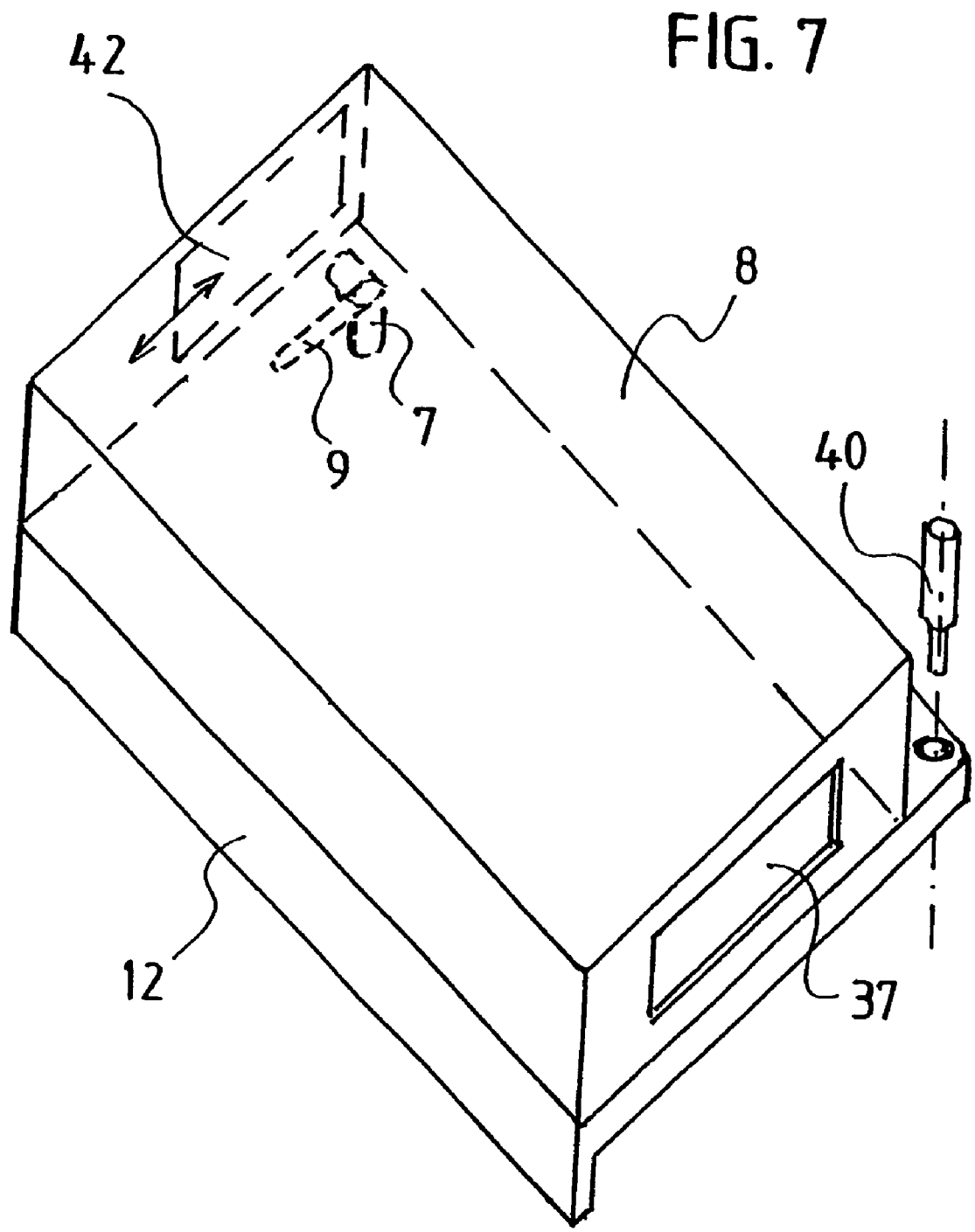
Figure 8:
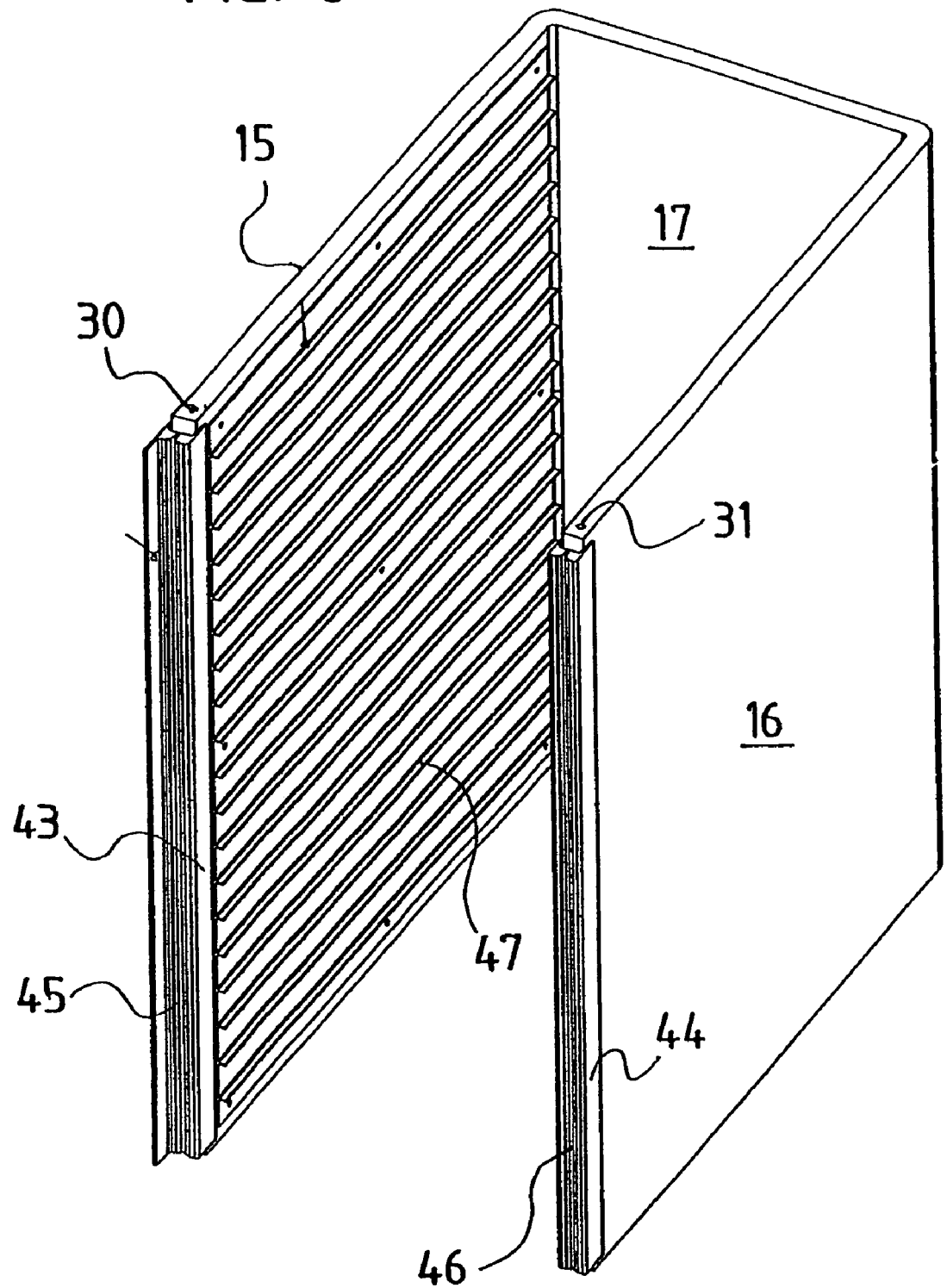
Figure 9:
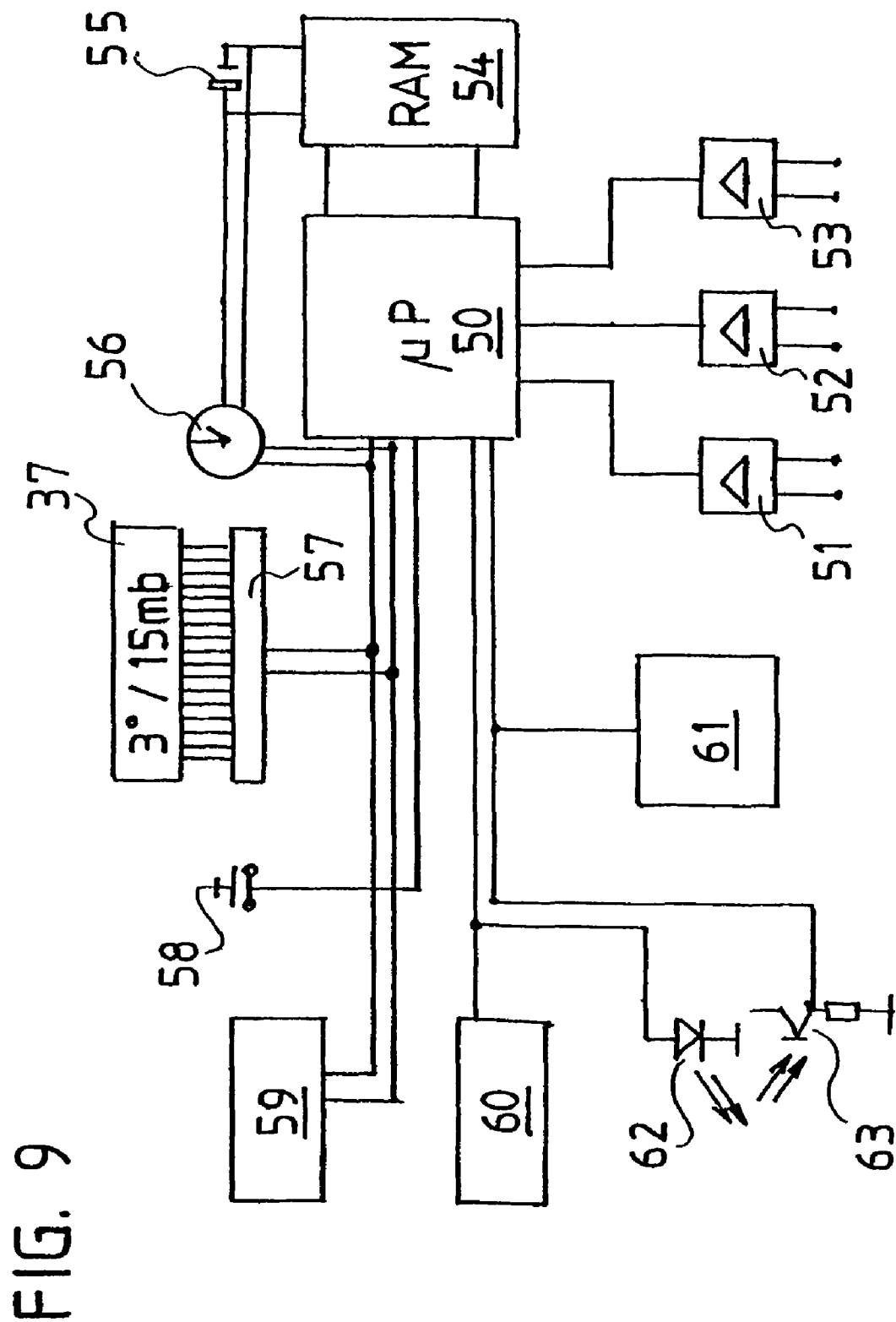

FIG. 1: the device in a perspective total view with closed doors;

FIG. 2: the device according to FIG. 1 with opened doors;

FIG. 3 an exploded drawing of the device in which all essentially components may be seen;

FIG. 4 the base plate of the device;

FIG. 5 the intermediate plate of the device for a container with two front doors arranged above one another;

FIG. 6 the intermediate plate of the device for a container with a single front door;

FIG. 7 the lid plate of the device with the box constructed thereon, with a display;

FIG. 8 the one-piece construction element which forms the side walls and the rear walls of the container or a container storey, in a perspective view, with the frame profiles placed onto the front edges;

FIG. 9 a schematic representation of the basic connection circuit of the means for measuring, storing and outputting the measurement data and displaying these on a display.

DETAILED DESCRIPTION OF THE DRAWING FIGURES AND PREFERRED EMBODIMENTS

FIG. 1 shows the device in a perspective total view. It is the case of a box-like container 1 which is placed upright and stands on wheels 2, 3, wherein the rear wheels 3 advantageously have a fixed track to the container 1, whilst the front wheels 2 are free-running wheels whose track direction may thus be pivoted by 360°. With such a usual travelling mechanism the container 1 may be pushed very easily and may be manoeuvred into corners and gaps. The container 1 at its front side is equipped with at least one pivotable door. In the shown example it comprises two container compartments 48, 49 which are arranged above one another which in each case may be closed with a pivotable front door 4, 5. In the same manner the container may also be divided into three or even more container compartments. The peculiarity of this container 1 is the fact that the front doors 4, 5 may be dosed in an airtight manner and the container 1 itself is designed in a universally airtight manner, and further that it comprises at least one air valve 6 to the outside which may be dosed and opened. In the shown example two valves 6 are provided on a rear side via which the air in the inside of the two container compartments 48, 49 may be pumped out when the doors 4, 5 are dosed, so that an almost full vacuum prevails in the inside of the container compartments 48, 49. A further valve 7 serves for venting the container and thus for breaking down the vacuum. It is provided with a rounded actuation lever 9 or valve wheel and may be opened by hand. Since it is accommodated at the top in the inside of the lid 8, it is drawn only dashed here. It is therefore accommodated below the lid so that it is not too easily accessible and may thus not be inadvertently opened. When opened, air from the outside flows into the inside of the container and permits the pressure therein to increase to the outer pressure. Afterwards, the doors 4, 5 may be opened. Finally a means 8 for measuring and storage as well as for displaying the temperature and the pressure in the inside of the dosed container 1, which may be read off at the outside, also belong to the container 1. Since this data is measured and stored over a certain time period, it may be displayed and read out as diagrams over a time period of at least 14 days, whereupon it may be printed out as the case may be. Finally an identification code may yet be inputted and read out with the means which then accompanies the food which is intermediately stored in the container until their removal, so that the collected data may be allocated to this food at any and a later point in time. The container 1 is designed such that it may accommodate the forces which act with the strong prevailing vacuums which are produced in its inside, without changes in its shape, and that it remains perfectly airtight under such strong vacuums of 10 mbar to 30 mbar.

FIG. 2 shows the container 1 with opened front doors 4, 5. If the container has two separate front doors 4, 5 arranged above one another at its disposal, its inside too is correspondingly separated into two container compartments 48, 49 arranged above one another. Each door 4, 5 may be dosed separately in an airtight manner in that in the closed condition it is pressed onto a peripheral rubber seal. Each container part 48, 49 may therefore be set separately under a vacuum and vented again and may be separately opened and closed.

FIG. 3 shows an exploded drawing of the various components of the device. In the example shown here the container 1 consists of a base plate 10, of an intermediate plate 11, of a lid plate 12, as well as two wall elements 13, 14 which here are identical and are U-shaped in a plan view. These in each case form the left side wall 15, the oppositely lying right side wall 16 and the associated rear wall 17 running between these at a right angle, of a container compartment 48, 49 or container storey. The container 1 is then designed such that these components 10-14 may come to lie over one another like a sandwich and the intermediately lying elements 13, 11, 14 are clamped in between the base plate 10 and the lid plate 12 and are tensioned with these. For this purpose, the base plate 10 which consists of solid material comprises a milled recess which is U-shaped in a plan view, here in the shape of a U-shaped groove 18 into which the U-shaped wall element 13 fits with its lower edge. In the same manner an equal U-shaped groove is taken out of the lower side of the intermediate plate 11. The upper edge of the lower wall element 13 fits into the groove which is not visible here. Again a U-shaped groove 19 for accommodating the lower edge of the upper U-shaped wall element 14 is taken out on the upper side of the intermediate plate 11. And finally a U-shaped groove is likewise milled out of the lid plate 12 on its lower side, into which the upper edge of the upper wall element 14 fits. The base plate 10 on its front side comprises a projection 20 which lies somewhat deeper than the upper side of the base plate. The projection 20 extends around the right front edge (corner) of the base plate and here comprises a bore 21 which is envisaged to accommodate a hinge pin. A groove 22 is milled out of the front side of the base plate above the projection 20, into which the horizontal section of a peripheral rubber seal may be inserted. If one observes the intermediate plate 11, then one recognises that a similar projection 23 is here also worked from the solid material, which likewise comprises a bore 24 for a hinge pin. On the intermediate plate 11 on the front side however, not only is a groove 25 milled out above the projection, but a further groove 26 is also milled out of the front side below the projection. These grooves 22, 25, 26 are envisaged for accommodating the horizontal section of the peripheral rubber seals for the corresponding doors. The vertical sections of the peripheral rubber seals run along the front edges of the wall elements 13, 14 in grooves which are present here which are shown in more detail in FIG. 8. The lid plate 12 corresponds in principle to the base plate 22, it is merely a mirror image of the latter. Its projection 27 extends however also around the right front edge (corner) and is flush with the upper side of the lid plate 12. A groove which here may not be seen is milled out of the front side of the lid plate 12 below the projection, just as the groove 22 in the base plate 10. In the base plate 10 two threaded bores 28, 29 are in each case arranged near to the ends of the U-shaped groove 18 so that these threaded bores 28, 29 lead through the base of the groove 18, 19 into the material of the base plate 11. Corresponding bores 30, 31 pass through the end regions of the two limbs of the U-shaped wall element 13 at a small distance to the front edge. The wall element 13 may therefore accommodate two threaded rods which extend in the inside of this element along its front edges. Exactly the same applies to the U-shaped wall element 14 of the upper container compartment 48. The intermediate plate 11 likewise comprises bores at the same location, but continuous bores 32, 33. Continuous bores 34, 35 are likewise present in the lower side of the lid plate 12, but stepped bores which however may not be seen here. Before placing the individual components onto one another, the grooves 18, 19 on the base plate 10 and intermediate plate 11 as well as the corresponding grooves on lower side of the intermediate plate 11 and the lid plate 12 which may not be seen are filled with a special sealing mass. Afterwards the wall element 13 is placed onto the base plate 10 and then the intermediate plate 11 is placed onto this. Afterwards the upper wall element 15 is placed onto the intermediate plate and the lid plate 12 is finally placed onto the upper edge of this upper wall element. Now, from above, threaded rods may be introduced through all components up to into the threaded bores 28, 29 in the base plate 10. These threaded rods may be fixedly tensioned from the upper side of the lid plate 12, so that the elements may be pressed together in a close-fitting manner and airtight connections arise. It is to be understood that the intermediate plate 11 may be omitted, or also a container which is not so high may be constructed. Such a container then merely comprises a single front door. Otherwise it has the same features and may be applied in a practically equal manner, even if this is not so variable. A further valve 36 is installed at the front in the middle of the intermediate plate 11, in order to either separate the two container compartments 48, 49 in an airtight manner or to create a pressure compensation between them. At the top on the upper side of the lid plate 12 there is assembled a device 8 with electronics which comprises a display 37 for displaying the measured values in the inside of the container compartments 48, 49, specifically the temperature and the pressure, and, as the case may be, also the humidity over time. The associated front doors 4, 5 are drawn in front of the container compartments 48, 49. These are abutted on the projections 20, 23, 27 by way of strong bolts 38, 39, 40.

FIG. 4 shows the base plate 10 in an enlarged representation. It consists of a solid material, for example of aluminium since it must be light and very stable with regard to deformation. It is indeed the case that the base plate should also have an as low as possible thermal conductivity. However with the aluminium here, a certain amount of compromise is made. It is also conceivable for other materials to be used which have similar values with regard to the deformation stability and weight, and at the same time have improved heat insulation values. In the shown example an aluminium solid material plate is used and by way of milling from the solid material a projection 20 is shaped which extends around the right front edge of the base plate 10. A bore 21 is provided for accommodating a hinge pin for the front door of the container 1. A U-shaped groove 18 is milled out of the material of the base plate 10 from above. As already described, this is envisaged for accommodating the lower edge of a U-shaped wall element. Threaded bores 28, 29 are incorporated into the base plate 10 near to the front ends of the U-shaped groove, which are envisaged for accommodating and for tensioning the threaded rods. In the front side of the base plate 10 above the projection 20 one recognises the groove 22 for the seal for sealing off the front door. The travelling mechanism is assembled on the lower side of the base plate 10. Here, this consists of two rear wheels 3 with a fixedly aligned track and two front wheels 2 which may be freely steered.

FIG. 5 shows the intermediate plate 11 for a container with two front doors arranged above one another. This consists of the same material as the base plate and at its front side a projection 23 extends to the front and around the right front edge. In each case a U-shaped groove 10 is milled out of the upper side as well as out of the lower side of the intermediate plate 11 and is envisaged to accommodate the wall elements. Near to the front ends of these grooves 19 these are connected via continuous bores 32, 33 which are envisaged for accommodating the threaded rods for tensioning the components with one another. On the front side above as well as below the projection 23 one may recognise in each case a groove 25, 26 which in each case serve for accommodating the seals for sealing the front doors.

FIG. 6 shows the left front edge (corner) of a modified intermediate plate 11. It is the case of the design of the intermediate plate for a device with only a single container door. In this case specifically no projection is required which separates the two doors from one another, but the door extends over the free space of the openings of both container compartments 48, 49. These container compartments above and below the intermediate plate 11 are not mutually sealed since this does not make any sense. For opening the common door the pressure in both container compartments 48, 49 must in any case be increased to the pressure of the surroundings. The door is sealed on this modified intermediate plate 11 only via the vertically running sealing sections 41 which are inserted into correspondingly small grooves.

FIG. 7 shows the lid plate 12 of the device with the box 8 constructed thereupon, with a display 37 on the front side. The temperature and the prevailing pressure in the inside of the container may be read off at any time on this display, as the case may be also the humidity in the inside of the container. In another display mode which the electronics selectively permits, one may read off the history, that is to say the course of the temperature and pressure as well as possibly the humidity during the past, up to 14 days. The means 8 has an interface at its disposal so that all stored data may be read on a PC and may be printed out from the PC. A sliding door 42 is arranged on the rear side of the means 8 or its shell. The pressure valve 7 with the actuation lever 9 is arranged behind this sliding door, via which the inside of the container may be vented. For this reason the valve is arranged somewhat hidden so that unauthorised persons due to a too easy access, or kitchen workers, for reasons of undue care, are not able to admit air into an already evacuated container.

FIG. 8 shows a one-piece construction element which forms the side walls 15, 16 and the rear wall 17 of the container 1 or of a container storey 48, 49, in a perspective view. Frame profiles 43, 44 are pushed over the front edges of this construction element. The frame profiles 43, 44 each comprise a groove 45, 46 into which a peripheral rubber seal may be applied which as the case may be extends into the grooves 22, 25, 26. These frame profiles 43, 44 are sealingly adhered to the front edges of the construction element. The frame profile 43 which is arranged on the left in the drawing runs into a continuation which serves for closing the door with a non-positive fit. For this, the door is provided with a closure mechanism which builds up and maintains large closure forces. One may recognise bores 30, 31 on the upper side of the construction element through which the threaded rods are led for tensioning the individual components. The construction element itself consists of a highly stiff lightweight construction material. For example a sandwich plate with a foamed core and aluminium plates glued thereon on both sides is suitable. Such plates for example are used in the construction of floors in aircraft. Or a plate of an aluminium honeycomb structure or a laminate of several layers of such structure plates may be suitable, which are glued on both sides to heat-insulating plastic plates. The side wall and the rear wall of the construction element indeed need to accommodate large forces if the inside of the container is evacuated and here a pressure of only about 10 mbar to 30 mbar prevails. At the same time the walls should let through as little heat as possible. On the inner side of the construction element the side walls are equipped with tray rests 47. These may be manufactured of aluminium or of a plastic and be adhered to the inner side of the side wall. These tray rests 47 form a row of carrier strips arranged above one another, on which the tray may be pushed.

The door or the doors 4, 5 in the case of two or more doors are abutted with strong hinge pins 38, 39, 40 on the base plate 10, the intermediate plate 11 and the lid plate 12. On the free side the doors 4, 5 may be pressed in a dose fitting manner onto the seals with lever locks or thread closures, on which the doors bear with their inner side. The closures must be designed such that after the closure of the doors, the inside of the container is sealed to the outside in an airtight manner.

FIG. 9 shows a schematic representation of the principle circuit of the means for measuring and storing the measurement data and for displaying these in a display. The means permits at least the measurement of the temperature and of the pressure in the inside of the container. In the design shown here they may however also measure the humidity in the inside of the container. For this a probe or sensor is provided in each case, that is to say a temperature sensor 51, a humidity sensor 52 and a pressure sensor 53. These deliver electrical signals to a microprocessor 50 which is connected to a write-read memory RAM (random access memory) 54. This is supplied with current by a 3 Volt lithium battery 55. It obtains data from an electronic dock 56 and from an EPROM IDENT (erasable programmable read only memory) 59, in which an identification code is allocated to each charge which is placed into the container. This input to the EPROM IDENT 59 is effected via the operating keys or buttons. The data is delivered to the microprocessor 50 and is processed with those from the RAM 54. Via the driver unit 57 they reach the display 37 for the display. The data may not only be read out via the display 37 but also via a communication interface (RS 232) 60. Instead of or parallel to such a cable-supported communication port there is yet provided an infra-red interface 62, 63 by way of which the data may be transmitted to a PC without cable. As already mentioned, an identification code is allocated to each charge or meals, and this code may be inputted via the button 58. From now on the temperature, the humidity and the pressure in the inside of the now closed container is continuously measured and the data is stored. At any moment the up-to-date measurement data may be displayed in the display 37 so that one may check at any point in time as to what the temperature and the pressure as well as the humidity in the inside of the container is. These values may be displayed in the display 37 also in its temporal course. Shown in the schematic diagram is the display of a temperature of 1.5° C. and a pressure of 15 mbar. This data may furthermore be read out via the communication interfaces, be it via the RS 232 interface 60 or via the infra-red interfaces 62, 63 for the input and output, and be processed in a PC into suitable diagrams and printed out. It is thus possible to also later identify each food charge stored or transported in the container and to follow up on its history. With shortcomings in quality one may prove as to whether the pressure, the temperature or the humidity in the inside of the container were within the prescribed band width during the keepage time. The temperature in the ideal case should constantly be between 2° C. and 4° C. and the pressure should not increase above 20 mbar. The humidity should lie between 30% and 90% relative air humidity. Tolerances may be prescribed within which the quality of the stored and transported meals over a certain period of time may be ensured.

The use of this device is now carried out as follows, wherein one may differentiate as to whether it accommodates readily prepared set-dish meals or also as a food carrier with various contents. Thus for example it may contain several food carriers for soup, for meat, for vegetable and for starchy products such as pasta, potatoes or rice. In any case the foods are almost completely cooked and afterwards are rapidly cooled to 2° C. to 4° C. As soon as the shock cooling has been completed, the meals are put into this device. A recording is made at a PC for each charge. Each charge is provided with a run code which is stored in a microchip which is intrinsic to the device. From now on, the temperature, the pressure and the humidity may be continuously measured and the data is constantly stored. The door is then dosed and the container is set under a vacuum in that the air is pumped from its inside via the air valve by way of an external air pump, until the vacuum has reached at least a pressure of 10 mbar to 30 mbar. The charge may now be intermediately stored over 10 to 14 days without the stored food suffering any reduction in quality. If the meals are then finally required, one firstly checks as to whether the temperature and the pressure are still in order before removal of the food, the container is then vented by actuating the lever 9 of the valve below the lid and the door may then be opened and the food removed. These are then left standing for about 15 minutes so that they may be able to take in air and in particular oxygen. In the case of ready made set-dish meals these may then be merely placed in a steam heater (steamer) and they are ready to serve within a few seconds. In the case of food carriers which contain various meal contents, either the complete food carrier with the contents is heated in the steam heater and afterwards the contents are served separately, or the hot ingredients are serves on a plate, heated in the steamer and subsequently immediately served.

LIST OF REFERENCE NUMERALS 1 container
2 front wheels, pivotable
3 rear wheels, fixed track
4 upper front door
5 lower front door
6 air valve in the rear wall
7 air valve in the upper side
8 means for measuring storing, displaying and outputting data 9 actuation lever for the air valve 7
10 base plate
11 intermediate plate
12 lid plate
13 lower U-shaped wall element
14 upper U-shaped wall element
15 left wall
16 right wall
17 rear wall
18 U-shaped groove in the upper side of the base plate 10
19 U-shaped groove in the upper side of the intermediate plate
20 projection on the front side of the base plate 10
20 bore on the front side of the base plate 10
21 bore in the projection for hinge pins
22 groove for seal in the front side of the base plate
23 projection on the front side of the intermediate plate 11
24 bore in the projection 23 for the hinge pins
25 groove for the seal, upper front door in the front side of the intermediate plate
26 groove for the seal, lower front door in the front side of the intermediate plate
27 projection on lid plate
28 bore, left out of the groove 18 on the base plate 10
29 bore, right, out of the groove 18 on the base plate 10
30 bore, left, vertically through the wall element
31 bore, right, vertically through wall elements
32 bore, left through intermediate plate 11
33 bore, right, through intermediate plate 11
34 bore left from below in lid plate 12
35 bore right from below in lid plate 12
36 valve in the intermediate plate 11 between the upper and the lower container compartment
37 display on the means 8
38 hinge pin on base plate for the lower door
39 hinge pin on the intermediate plate
40 hinge pin on the lid plate
41 sealing section on the intermediate plate for a single container door
42 sliding door in shell 8
43 frame profile, left
44 frame profile, right
45 groove left on the wall element for the rubber seal door
46 groove right on the wall element for the rubber seal door
47 tray rests
48 upper container compartment
49 lower container compartment
50 microprocessor
51 temperature sensor
52 humidity sensor
53 pressure sensor
54 RAM random access memory (write read memory)
55 3V lithium battery
56 clock
57 driver unit
58 key
59 EPROM IDENT Erasable Programmable read Only Memory
60 RS 233 communication interface or port
61 battery 3×1.5 V
62 infra red sensor
63 infra red sensor

The invention claimed is:

1. An apparatus for transporting and an intermediate storage of cooked food and set dish meals, comprising:
an uprightly arranged container equipped with wheels and at least one front door pivotably openable, said container being closable in an airtight manner via said front door and comprising at least one air valve to outside of said container, said at least one air valve being able to be closed and opened and connectable to an exterior vacuum pump, said container further comprising a U-shaped wall element forming a first side wall, an oppositely-positioned second side wall and a connecting rear wall formed as a single workpiece sandwich plate made of several layers of a rigid and heat-insulating material, capable of accommodating forces when the inside of the container is evacuated to a pressure of 10 mbar to 30 mbar, said U-shaped wall element being clamped in between a base plate and a lid plate equipped with respective grooves directed toward said U-shaped wall element and, in the respective grooves, said U-shaped wall element fits with an upper edge and a lower edge thereof, clamping being achieved via threaded rods leading through said base plate, said lid plate and through an interior of said U-shaped wall element that are fixedly tensioned and pressed together in a close-fitting and airtight connection, with walls on their inner side of said U-shaped wall element being equipped with tray rests made of aluminum or plastic and adhered to the inner side of the side walls forming a row of carrier strips arranged one above another, onto which a tray is able to be placed, with said U-shaped wall element being positioned between an upper plate and a lower plate for forming an interior portion of said container as an airtight and heat insulated container compartment for maintaining a pressure within the interior portion of said container of approximately 10 mbar to 30 mbar over a time period of at least 14 days; and,
means for measuring and displaying temperature, pressure and moisture within the interior portion of said container when said container is closed, said means for measuring and displaying temperature, pressure and moisture including a display and an electronically readable-output via a communication interface to a computer for creating printable diagrams for the pressure, temperature and moisture within the interior portion of said container for the time period of at least 14 days.

2. The apparatus for transporting and an intermediate storage of cooked food and set dish meals according to claim 1, wherein said container has a base made of a single material plate with said base having a lower side with wheels, said container further including a rear wall and two side walls forming a one-piece component being U-shaped in a plan view, of foamed core and aluminum plates glued thereon on both sides, or a sandwich plate containing an aluminum honeycomb structure or a laminate of plurality layers an aluminum honeycomb structure plates, said rear wall and said two side walls being sealingly positioned in a groove in said base of said container, a lid for said container on its lower side fitable in an unmovable manner onto upper edges of said side walls and an upper edge of said rear wall and sealingly covering a clear space of said one-piece component, said base of said container, said side walls and said lid, at edges facing an open side of said container carry a peripheral, seamless rubber seal for closing said container in a sealed manner via pulling said at least one front door shut.

3. The apparatus for transporting and an intermediate storage of cooked food and set dish meals according to claim 1, wherein a rear wall and side walls of said container comprise one piece of a foamed core coated with aluminum plates.

4. The apparatus for transporting and an intermediate storage of cooked food and set dish meals according to claim 1, wherein said container, in height, is divided into two stories with a rear wall and side walls are interrupted by an intermediate base of a material plate upon which lower and upper sides said rear wall and said side walls are positioned in milled grooves.

5. The apparatus for transporting and an intermediate storage of cooked food and set dish meals according to claim 1, further comprising a frame-U-profile sealingly placed over edges of two side walls facing said at least one front door, and a groove for inserting a rubber seal is milled on an upper side of said frame-U-pro-file, wherein at least one said frame-U-profile in an assembled position on its outer side comprises a continuation extending frontwardly for closing said at least one front door shut.

6. The apparatus for transporting and an intermediate storage of cooked food and set dish meals according to claim 1, wherein said base plate is made with milled recesses from a solid material having, on its upper side, a milled groove for accommodating side walls and a rear wall, and on a front side, a recess milled outwardly from above, so that a projection is formed on a lower side of said base plate flush with said lower side and extending around a front edge of said base plate and including a bore for hinge pins of a said at least one front door, with a front side of said base plate being formed above said projection comprising a milled out groove for accommodating a rubber seal with said lid plate for said container being shaped in a mirror-image thereof, and a one-piece intermediate plate having on its lower side a shape of a lid plate and on its upper side of a base plate applied thereon in a fitting manner, said projection of said one-piece intermediate lid plate also forming a base plate.

7. The apparatus for transporting and an intermediate storage of cooked food and set dish meals according to claim 6, wherein said base plate, said lid plate and said one-piece intermediate plate are all made of a solid aluminum material.

8. The apparatus for transporting and an intermediate storage of cooked food and set dish meals according to claim 1, further comprising a box with a display and operating means are on said lid plate of said container wherein said means for measuring and displaying temperature and pressure inside of said container is accommodated.

9. The apparatus for transporting and an intermediate storage of cooked food and set dish meals according to claim 1, wherein said means for pumping air out of said container via said at least one air valve reduces pressure to, and maintains said pressure at, approximately 20 mbar within said container.

10. The apparatus for transporting and an intermediate storage of cooked food and set dish meals according to claim 1, wherein said means for measuring and displaying temperature and pressure within the interior portion of said container when said container is closed includes a temperature sensor and a pressure sensor for measuring the temperature and pressure, respectively, said temperature sensor and said pressure sensor being connected with the communication interface to the computer.

11. The apparatus for transporting and an intermediate storage of cooked food and set dish meals according to claim 1, wherein said transport means for said container includes wheels.

12. A method for preparing, transporting storing and serving cooked food and set dish means, comprising the steps of:
providing an apparatus for transporting and an intermediate storage of cooked food and set dish meals, comprising:
an uprightly arranged container having transport means and at least one front door pivotably openable, said container being closable in an airtight manner via said front door and comprising at least one air valve to outside of said container, said at least one air valve being able to be closed and opened and connectable to an exterior vacuum pump, said container further comprising a U-shaped wall element having a first side wall, an oppositely-positioned second side wall and a rear wall connected to said first wall and said second wall, said U-shaped wall element being clamped in between a base plate and a lid plate equipped with respective grooves directed toward said U-shaped wall element and, in the respective grooves, said U-shaped wall element fits with an upper edge and a lower edge thereof, clamping being achieved via threaded rods leading through said base plate, said lid plate and through an interior of said U-shaped wall element that are fixedly tensioned and pressed together in a close-fitting airtight connection, with said U-shaped wall element being positioned between an upper plate and a lower plate for forming an interior portion of said container as an airtight and insulated container compartment for maintaining a pressure within the interior portion of said container of approximately 10 mbar to 30 mbar over a time period of at least 14 days; and,
means for measuring and displaying temperature and pressure within the interior portion of said container when said container is closed, said means for measuring and displaying temperature and pressure including a display and an electronically readable-output via a communication interface to a computer for creating printable diagrams for the pressure and temperature within the interior portion of said container for the time period of at least 14 days;
substantially cooking food intended for later consumption for producing nearly cooked food;
cooling the nearly cooked food to a temperature of approximately 2° C.-4° C. within a time period of 90 minutes;
placing the nearly cooked food in said upright arranged container of said apparatus;
closing said front door of said container;
pumping air from the interior portion of said container until the pressure in the interior portion of said container is 10 mbar to 30 mbar for storing the nearly cooked food for a predetermined length of time;
storing the nearly cooked food in the container at the pressure of 10 mbar to 30 mbar and at the temperature of approximately 2° C.-4° C. for the predetermined length of time;
releasing said at least one air valve for increasing pressure within the interior portion of said container to atmospheric pressure for consumption of the nearly cooked food following conclusion of the predetermined length of time for storing the nearly cooked food; and,
completing cooking of the nearly cooked food, thereby producing cooked food ready for consumption.

13. The method for preparing, transporting, storing and serving cooked food and set dish means according to claim 12, wherein said step of cooling the nearly cooked food to a temperature of approximately 2° C.-4° C. within a time period of 90 minutes is performed via shock cooling.

14. The method for preparing, transporting, storing and serving cooked food and set dish means according to claim 12, wherein said transport means for said container includes wheels.

* * * * *